T. MIDGLEY.
MOLD FOR WHEEL TIRES.
APPLICATION FILED MAR. 7, 1914.
1,258,592.
Patented Mar. 5, 1918.
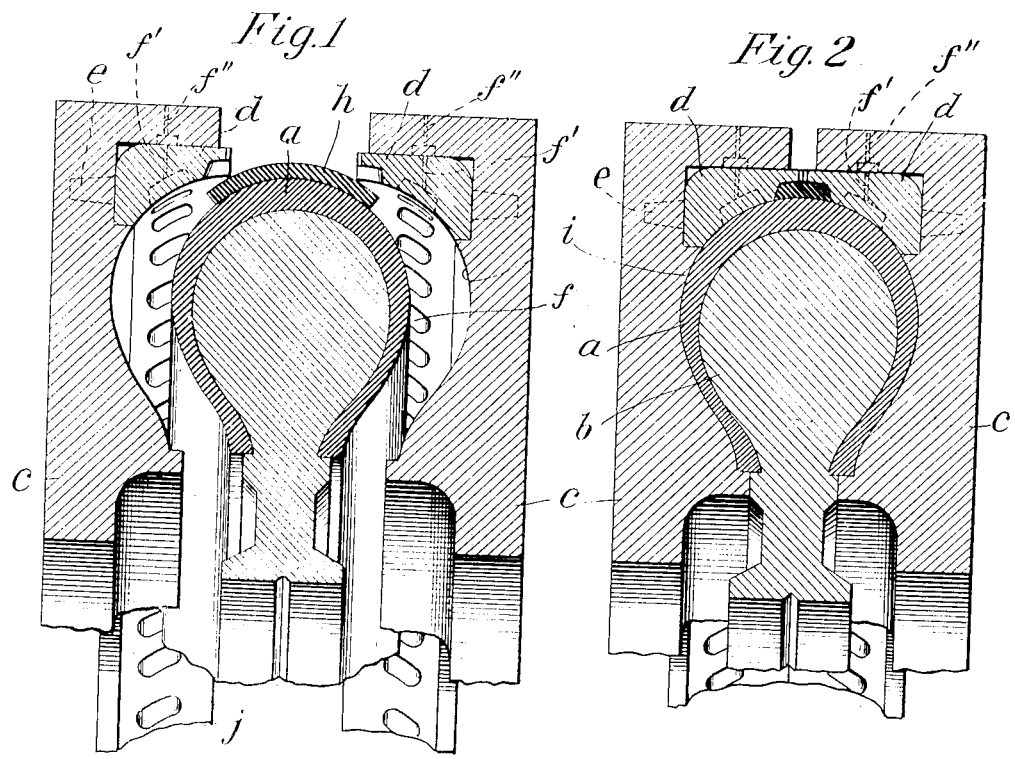
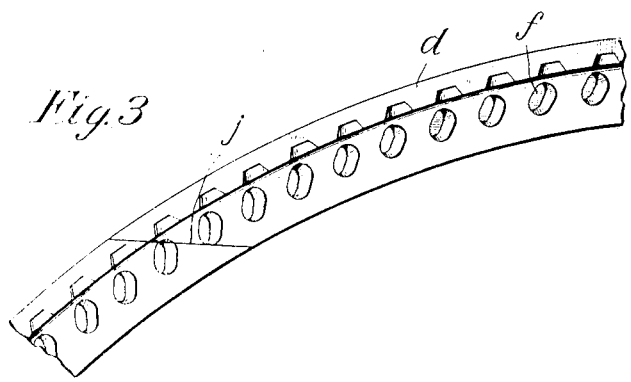
Witnesses:
F. B. Vanderbilt
Veronica Braun
Thomas Midgley
Inventor
By his Attorney
Ernest Hopkinson

UNITED STATES PATENT OFFICE.

THOMAS MIDGLEY, OF WORTHINGTON, OHIO, ASSIGNOR TO MORGAN & WRIGHT, OF DETROIT, MICHIGAN, A CORPORATION OF MICHIGAN.

MOLD FOR WHEEL-TIRES.

1,258,592.   Specification of Letters Patent.   Patented Mar. 5, 1918.

Application filed March 7, 1914. Serial No. 823,155.

*To all whom it may concern:*

Be it known that I, THOMAS MIDGLEY, a citizen of the United States, residing at Worthington, county of Franklin, and State of Ohio, have invented certain new and useful Improvements in Molds for Wheel-Tires, of which the following is a full, clear, and exact description.

This invention relates to molds for wheel tires and particularly to molds for forming configurations which on account of their complicacy of shape necessitate the mold being made in a number of parts to facilitate its being removed from the finished article in sections by suitably directed movements to prevent the interlocking of the article and mold as would otherwise be the case.

The object of this invention is to provide a mold of the above characteristics, which besides being simplified as to its construction, operates also to simplify the molding operation, thereby making a corresponding saving in the cost of manufacturing the molded articles.

In the drawings—

Figure 1 is a transverse sectional view of the device showing an initial step in the molding operation of a wheel tire, the mold sections being in open position;

Fig. 2 is a similar view showing the final step in the molding operation, the mold sections being in closed position; and Fig. 3 is a fragmental view of one of the matrices for molding the tread of the tire.

The usual mold for forming tires having plain treads is made of two sections which are moved laterally to and from the tire supporting core. When however it is desired to mold projections upon the tread of the tire, as is done in the usual types of non-skid tires, such a simple mold will not suffice. Here the projections interlock with the corresponding depressions of the forming mold and will not permit of a simple lateral movement of the mold sections outward. I have found however that the lateral movement inwardly of the matrix parts will serve to form the projections in the yielding rubber material, and it is the devising of means for the employment of this movement that constitutes an important feature of my invention.

Heretofore molds for forming this class of tires have included sectional matrices for forming the tread portion of the tire, which during the forming operation have been confined to a movement radially toward the tire. In such constructions the matrices have independent movements relative to the mold sections, and the initial step preliminary to the molding operation necessitates the independent assembling of each of the several parts about the tire to be molded. This requires considerable care and time as the parts are heavy and cumbersome and must be carefully positioned relative to the tire and to each other before the final pressure is applied to mold the article. I have materially simplified this procedure by detachably securing the matrices to their respective mold sections as a preliminary step, so that the matrix and mold section may be moved together as a unit. This may be done at any convenient time and place by unskilled labor, and all that is necessary in forming the tire is to move the sections of the mold together by lateral movement in the usual manner followed in forming tires having no mold interlocking tread projections. The detachable connection between the mold section and matrix permits these parts to readily separate during their removal from the finished article, thereby permitting each part to be moved independently and given the necessary direction of movement to free it from the portion of the tire which it has been instrumental in forming.

In carrying out my invention the tire $a$ may be of any desired construction and may be built up on any convenient core illustrated in the present instance by the core $b$. The mold is constructed in two sections $c$—$c$ each of which is chambered out to receive a tread matrix member $d$. If desired, dowels $e$ may be employed to better connect the matrix members to their corresponding mold sections. The matrices are formed with suitable depressions $f$ for producing the desired projections upon the tire tread illustrated in Fig. 2 as knobs $g$, which may be formed from a strip of green rubber placed upon the tire tread as at $h$, Fig. 1. The depressions $f$ are provided with the usual vent holes $f'$, the inner rows of which are connected with passages $f^2$ formed in the mold section to provide outlets for the air and for the surplus rubber stock. The inner faces of the mold sections and matrices are shaped similarly to the contour to be given the finished tire and in the present embodiment unite to form a continuous surface *i*.

The matrix for each side of the mold may be made in sections, but I prefer to form it in a single piece, and cut it through at one point as shown at *j* to form a split-ring like member. This construction expedites the handling of the parts for there will be but one matrix part to be assembled and removed at each side of the mold. The matrix member is made sufficiently yielding, however, to permit it to be forced apart at the cut *j* and to be sprung outwardly to free it from the projections *g*.

The manner of using the mold is as follows: The matrix members are first placed in engagement with their respective mold sections which are afterward brought to assume the positions shown in Fig. 1. Lateral pressure is then applied to them until the parts assume the positions shown in Fig. 2, which single movement completes the molding operation, there being no radial movement of the matrices during this operation. When the mold is removed, the mold sections are first withdrawn by an outward lateral movement leaving the matrix members in their interlocked positions with the projections upon the tread. These members are next removed by first springing one of their ends outwardly at the cut portion and continuing this movement the entire way around the tire, keeping the members in substantially a radial plane until they are entirely free from the tread, any suitable means being employed for holding them away from the tread after they have been once separated.

Having thus described my invention, what I claim and desire to protect by Letters Patent is:

1. A tire forming mold comprising oppositely disposed side sections adapted to move laterally toward each other for forming the tire and in an opposite direction during their removal from the formed tire and oppositely disposed split rings of yielding material constituting tread matrix members adapted to be detachably engaged by the sections to move laterally as a unit therewith while forming the tire and adapted to be removed from the tire by being sprung outwardly upon withdrawal of the side sections.

2. A tire forming mold comprising sections adapted to move toward and away from each other respectively in forming a tire and in the subsequent removal of the mold and split rings of yielding material constituting tread-matrix members having their surfaces configured to provide projections on the surface of the tread, said matrix members being detachably engaged by the sections to move laterally as a unit therewith while forming the tire and adapted to be removed from the tire by being sprung outwardly upon withdrawal of the sections of the mold.

Signed at Detroit county of Wayne, State of Michigan, this 27th day of February 1914.

THOMAS MIDGLEY.

Witnesses:
J. H. SWIFT,
E. LA BUSCKEWSKY.